United States Patent
Grassmann

(10) Patent No.: US 8,030,605 B2
(45) Date of Patent: Oct. 4, 2011

(54) METHOD AND DEVICE FOR THE UTILIZATION OF SOLAR ENERGY

(75) Inventor: Walter Grassmann, Bamberg (DE)

(73) Assignee: Isomorph Holding AG, Speicher (CH)

( * ) Notice: Subject to any disclaimer, the term of this patent is extended or adjusted under 35 U.S.C. 154(b) by 26 days.

(21) Appl. No.: 12/594,588

(22) PCT Filed: Apr. 3, 2008

(86) PCT No.: PCT/EP2008/002661
§ 371 (c)(1),
(2), (4) Date: Nov. 30, 2009

(87) PCT Pub. No.: WO2008/119564
PCT Pub. Date: Oct. 9, 2008

(65) Prior Publication Data
US 2010/0116320 A1      May 13, 2010

(30) Foreign Application Priority Data

Apr. 3, 2007   (DE) .......................... 10 2007 016 084
Oct. 26, 2007  (DE) .......................... 10 2007 051 359

(51) Int. Cl.
*H01L 31/052* (2006.01)

(52) U.S. Cl. ................. 250/203.4; 126/569; 136/243

(58) Field of Classification Search ............. 250/203.4; 126/569–582; 136/243–246
See application file for complete search history.

(56) References Cited

U.S. PATENT DOCUMENTS

| 4,063,543 | A | 12/1977 | Hedger |
| 4,297,521 | A | 10/1981 | Johnson |
| 5,632,823 | A * | 5/1997 | Sharan ......................... 136/246 |
| 7,677,241 | B2 * | 3/2010 | Hickerson ..................... 126/600 |
| 7,763,835 | B2 * | 7/2010 | Romeo ....................... 250/203.4 |
| 2006/0201498 | A1 | 9/2006 | Olsson et al. |

FOREIGN PATENT DOCUMENTS

| DE | 27 16 108 A1 | 3/1979 |
| DE | 29 01 002 A1 | 7/1979 |
| DE | 199 32 646 A1 | 2/2000 |
| FR | 2 354 590 | 1/1978 |
| FR | 2 453 369 | 10/1980 |
| WO | WO 8000271 | 2/1980 |

* cited by examiner

*Primary Examiner* — Seung C Sohn
(74) *Attorney, Agent, or Firm* — William A. Loginov, Esq.; Loginov & Associates, PLLC

(57) ABSTRACT

The present invention concerns an apparatus (100, 200) for and a method of using solar energy. To provide an alternative apparatus (100, 200) and an alternative method of using solar energy which structurally requires less complication and expenditure and which is favorable in provision and operation, in accordance with the invention there is proposed an apparatus (100, 200) comprising a target (50) and reflectors (10, 12, 210) for deflecting solar rays on to the target (50) and a corresponding method, wherein the reflectors (10, 12, 210) are respectively pivotable about an axis (20, 220) for tracking in accordance with the azimuth of the sun (30) in the course of a day, wherein the axis (20, 220) is a component part of an axis arrangement (70, 270) which is inclinable for tracking in accordance with the midday height of the sun (30) in the course of a year. If necessary it is possible to achieve continuous focusing of the system by simple mechanical compensating mechanisms.

13 Claims, 11 Drawing Sheets

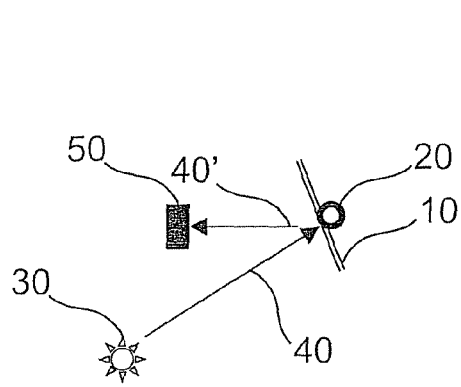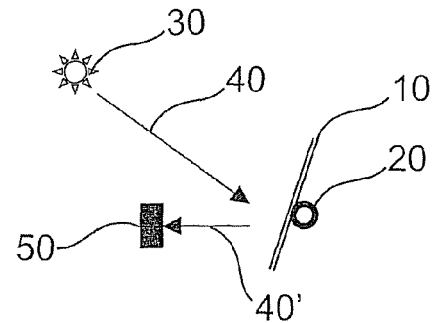
Fig. 1a        Fig. 1b
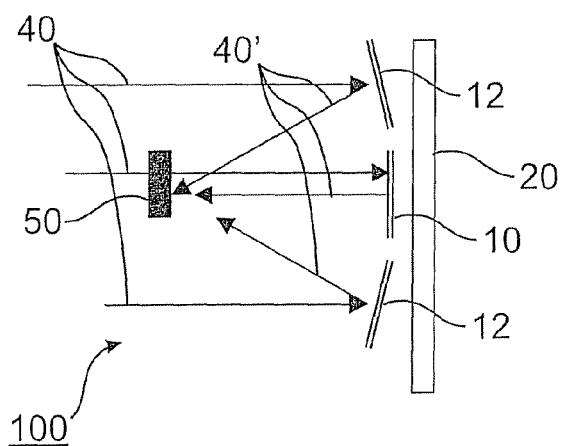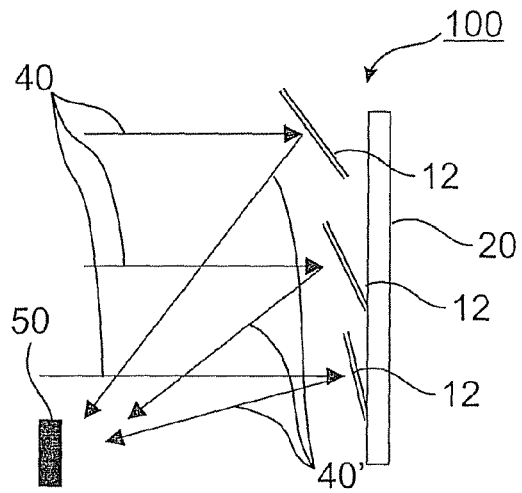
Fig. 2a        Fig. 2b
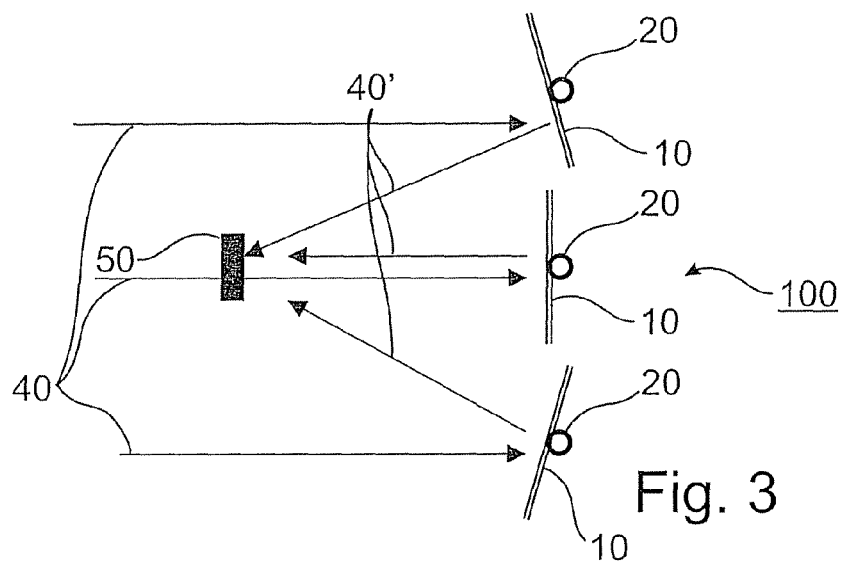
Fig. 3

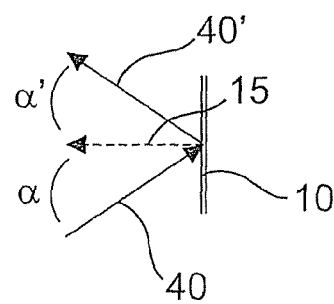
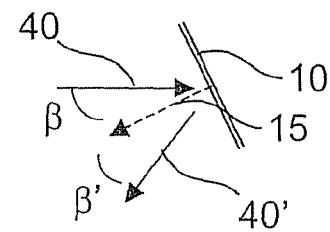
Fig. 12a    Fig. 12b
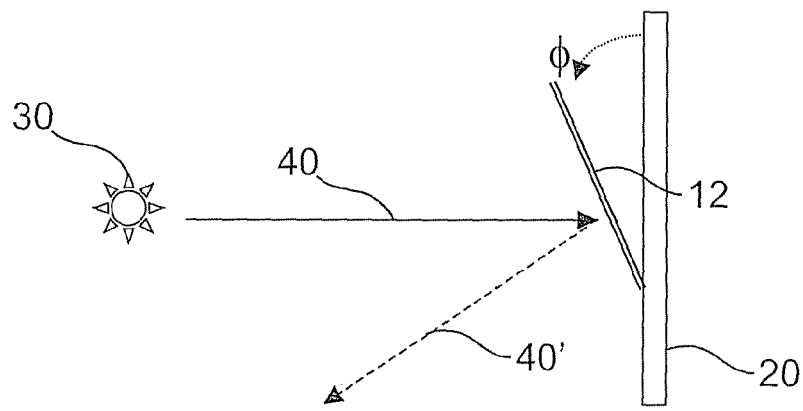
Fig. 13
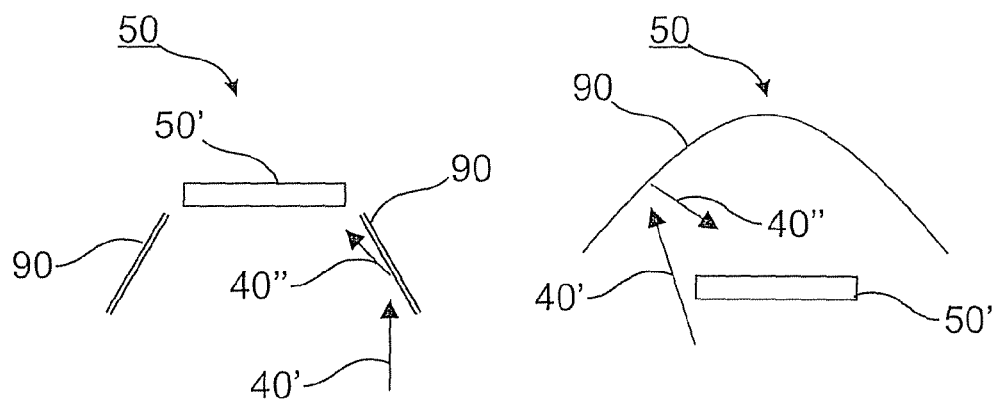
Fig. 14a    Fig. 14b

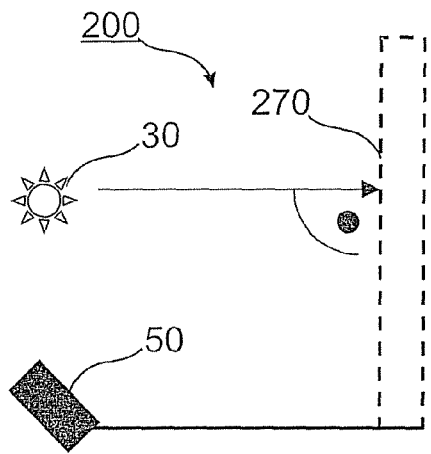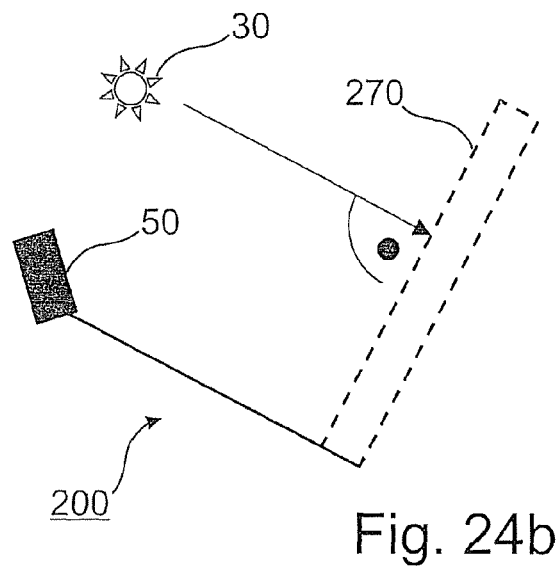
Fig. 24a    Fig. 24b
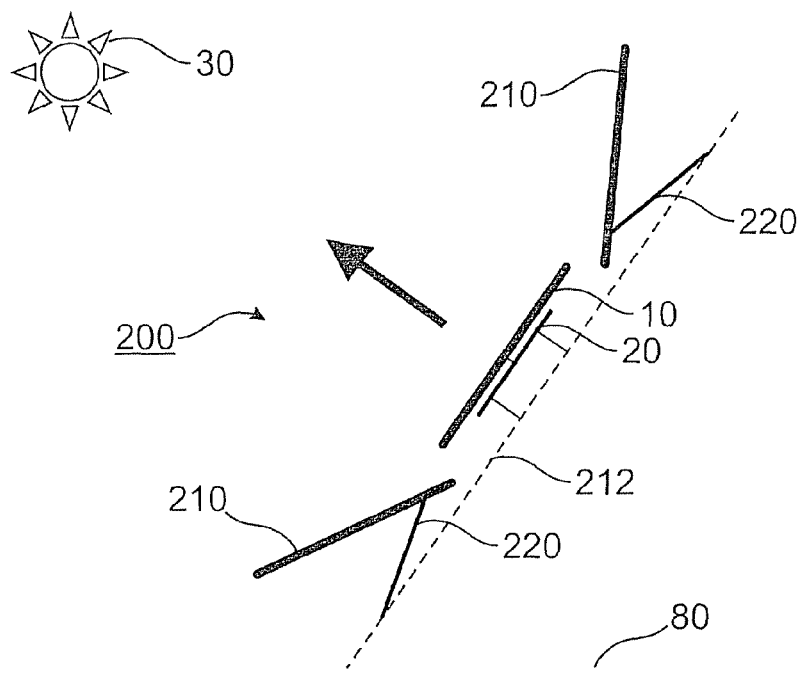
Fig. 25

METHOD AND DEVICE FOR THE UTILIZATION OF SOLAR ENERGY

FIELD OF THE INVENTION

The present invention concerns an apparatus for and a method of using solar energy.

BACKGROUND OF THE INVENTION

The sun radiates about a kilowatt of energy on to each square meter of the surface of the earth when incident thereon in perpendicular relationship. A large number of different methods of and apparatuses for using that solar energy radiated by the sun is known.

In photovoltaics sunlight is directly converted into electric current. It will be noted however that the costs of that method are very high, at the present time a square meter of photovoltaic solar cells costs about €700.00. The energy efficiency of the method is about 20%.

An alternative approach involves using energy radiated by the sun for producing heat. Some methods and apparatuses are known in that respect, in which sunlight is concentrated by means of trackable mirrors.

The heat to be achieved in that way serves for example for heating an oil or for heating a liquid salt. The oil or salt heats water to produce steam. The steam produced is used to drive a steam turbine for power generation by means of a power generator. That approach is technologically viable but it is found to be comparatively complicated and expensive.

A further approach involves the provision of parabolic mirror installations in which a sufficiently large, closed mirror surface is used to track the sun. That tracking operation is effected by pivoting and inclining the parabolic mirror installation so that actuation in respect of two axes is necessary. As a consequence of the large mirror area such an installation is generally high in weight so that it is only with corresponding difficulties that it can be directed towards the sun with an adequate degree of accuracy. The focal point of the system moves with the position of the sun, which causes difficulties in terms of using the focused rays of the sun as thermal energy. An example of such a system is a 'solar dish', as is described for example at http://www.solarpaces.org/resources/technologies.html.

Simpler tracking can be achieved with trough-type mirror systems as they only have to be moved about one axis. The trough-type mirrors heat a tube which extends in its focal line. A problem arises in terms of technical implementation in that long tube systems have to be adjusted, heated and protected from heat losses, which in turn makes the installations expensive. An example of such a system is the Andasol project (http://ww.solarmillennium.de/).

In the so-called 'solar tower' concept a large number of mirrors is directed on to a common point at the tip of the 'solar tower'. In that case in turn each of the mirrors must be individually controlled about two axes, which makes the method expensive in consideration of the accuracy required in that respect (see for example http://www.bmu.de/pressemitteilungen/pressemitteilungen_ab_22112005/pm/37405.p hp). The price of such an installation is about €1100.00 per square meter of mirror area and thus, with an energy efficiency of about 10%, is even higher than the price for the photovoltaic system.

A need for tracking of mirror systems for the concentration of sunlight arises out of the fact that, from the point of view of the earth, the sun apparently follows a flat circular orbit around the earth. The plane of that circular orbit can be described in that case by a unit vector which is perpendicular to that plane. As a consequence of the inclination of the axis of the earth with respect to the orbit the direction of that unit vector changes in the course of a year, which manifests itself in the fact that the midday height of the sun, that is to say the apparent height of the sun above the horizon, varies in the course of the year.

The known apparatuses for and methods of using solar energy are structurally complicated and expensive and in part costly to provide and operate.

SUMMARY OF THE INVENTION

Therefore the problem of the present invention is to provide an alternative apparatus for and an alternative method of using solar energy, in which the problems of the known apparatuses and methods are avoided or at least reduced.

That problem is solved by an apparatus for using solar energy having the features defined in claim 1.

That problem is also solved by a method of using solar energy having the features defined in claim 13.

Features of advantageous embodiments of the invention are defined in the appendant claims.

The apparatus according to the invention firstly includes a target and a number of reflectors for deflection of solar rays on to the target. In that arrangement the reflectors are respectively arranged pivotably about an axis to allow tracking of the reflectors in accordance with the azimuth of the sun in the course of a day, in order therefore to adapt the reflectors to the apparent movement of the sun across the sky in the course of a day. The respective axes are a component part of an axis arrangement which is inclinable for tracking according to the midday height of the sun in the course of a year. That means that the apparatus is adaptable to the change in the apparent path of the sun by virtue of the angle between the axis of the earth and the orbit of the earth around the sun.

With the pivotal movement of a mirror or reflector about an axis which like the above-discussed unit vector is perpendicular to the apparent plane of the path of the sun, the solar rays arriving from the sun can be deflected on to the same target over the entire day. In the case of a flat mirror that target represents a surface approximately of the size of the mirror while with a correspondingly curved mirror the rays can also be reduced substantially to a point. The region on to which the solar rays are deflected is usually also referred to as the 'hot surface' or 'hot spot'.

If a plurality of reflectors are directed in that way on to a common target the incident solar rays can thus be concentrated in the target region so that here there is an increased intensity of light (power per unit of area). The method and apparatus according to the invention only necessitate tracking of the reflectors in accordance with the azimuth of the sun in the course of the day, that is to say in accordance with the (celestial) direction from which the solar rays are incident, in which case such tracking can be implemented with a pivotal movement of the reflectors about the respective axis. The path of the sun which apparently changes in the course of the year is taken into account by virtue of the fact that the axis about which a reflector is pivoted in the course of the day is adapted by inclination of an axis arrangement accommodating that axis.

In a preferred embodiment the axis arrangement is adapted so that the axis can be oriented perpendicularly to a plane of the path of the sun by an inclination. With an axis oriented perpendicularly to the path of the sun the solar rays are deflected upon pivotal movement of the respective reflector substantially in the plane of the path of the sun so that it is possible in that way to achieve particularly simple directing of the solar rays on to the target.

In another preferred embodiment of the invention the axis arrangement has a multiplicity of axes and is so adapted that the axes are inclinable transversely relative to a plane parallel to the axes. When the axis arrangement in operation is so directed that the axes are arranged in mutually juxtaposed relationship substantially in the East-West direction, with the reflectors being turned towards the sun, then the axes can be adapted to the change in the apparent plane of the path of the sun in the course of the year by an inclination transversely relative to the plane defined by the axes.

In a further embodiment of the invention the axis arrangement has a multiplicity of axes and is so adapted that the axes are inclinable in a plane parallel to the axes. In the morning and in the evening respectively an axis arrangement oriented along the East-West direction as described hereinbefore has a comparatively small effective area in relation to the sun. If now the effective area relative to the sun is to be increased in the evening or morning time or if orientation in the East-West direction is not possible, then with an axis arrangement which allows inclination of the axes in a plane parallel to the axes, it is also possible to provide for orientation of the axis arrangement along a North-South direction in an extreme case, in which respect the inclination of the axes can be adapted to the midday height of the sun or the inclination of the apparent plane of the path of the sun.

Advantageously the axis arrangement can be so designed that it allows inclination of the axes both in a plane parallel to the axes and also transversely relative to such a plane.

In a further preferred embodiment of the invention at least two reflectors are pivotable about a common axis. A plurality of reflectors can be associated with a common axis so that to pivot those reflectors it is for example necessary only to drive that axis. If a plurality of reflectors are associated with an axis that plurality of reflectors can also be oriented jointly by orientation of the common axis, and that reduces the apparatus complication and expenditure.

In accordance with a further advantageous embodiment the apparatus according to the invention has a pivotal drive system for common pivotal movement of a plurality of reflectors about the respective axis, in particular with a first pivotal transmission device, by way of which a predetermined pivotal movement can be effected for each of the plurality of reflectors in dependence on the pivotal drive system. If a plurality of reflectors are pivoted jointly by a pivotal drive system, that reduces the apparatus complication and expenditure and allows control of the pivotal movement of the plurality of reflectors by controlling only the common pivotal drive system. If there is a pivotal transmission device it is also possible by means of the pivotal drive system to drive a plurality of reflectors which are to involve a respectively different pivotal behaviour. It is thus possible for even all reflectors of the apparatus according to the invention to be driven by means of a single pivotal drive system.

In a further advantageous embodiment of the invention the apparatus has a pivotal drive device associated with a reflector or an axis for pivoting the reflector or the reflectors associated with the axis. In addition there can advantageously be provided a second pivotal transmission device, by way of which a predetermined pivotal movement can be effected for each of the reflectors in dependence on the pivotal drive device. Instead of a common drive for a multiplicity of reflectors, it is also possible to provide for individual actuation of the pivotal movement of the reflectors by way of respective separate pivotal drive devices. The pivotal drive device can alternatively also be adapted to act on the reflectors of a common axis so that the reflectors of that axis are drivable jointly in co-ordinated relationship. Once again different pivotal movement of the jointly driven reflectors can be implemented by a second pivotal transmission device.

In a further embodiment of the present invention a part of the reflectors is tilted with respect to the respective axis. With tilted reflectors the solar rays can be deflected out of the apparent plane of the path of the sun, which makes it possible for a plurality of mutually superposed reflectors to be so co-ordinated that the solar rays deflected thereby are incident on a target which is not in a plane parallel to the plane of the path of the sun, with the reflectors.

In a further embodiment of the present invention a part of the reflectors is tiltable with respect to the respective axis. It is advantageous in that respect if a tilt drive system is provided for jointly tilting a plurality of reflectors with respect to their respective axis, in particular if there is also provided a first tilt transmission device, by way of which a predetermined tilting movement can be effected for each of the plurality of reflectors in dependence on the tilt drive system. It is also advantageous to provide a tilt drive device associated with a reflector or an axis for tilting the reflector or the reflectors associated with the axis, in particular if there is also a second tilt transmission device, by way of which a predetermined tilting movement can be effected for each of the reflectors in dependence on the tilt drive device. A particularly preferred embodiment of the invention has a drive for pivoting and tilting a plurality of reflectors, wherein there is provided in particular a transmission device, by way of which a predetermined pivotal and/or tilting movement can be effected for each of the plurality of reflectors in dependence on the drive.

In accordance with a further embodiment the target is coupled to the axis arrangement stationarily relative to the axis arrangement so that inclination of the axis arrangement results in a corresponding movement of the target which thus remains in the same relative position with respect to the reflectors. That means that there is no need for separate guidance of the target for adaptation to the altered plane of the path of the sun in the course of the year.

Alternatively it can be provided that the target is movable independently of the axis arrangement, in particular by means of a separate target drive.

In accordance with a preferred embodiment of the invention the reflectors have mirrors, in particular with flat mirror surfaces. Flat or planar mirrors are particularly simple and convenient in manufacture and do not require any special treatment or machining to be used in the context of the present invention.

In a further embodiment of the present invention the reflectors are adapted to focus the deflected solar rays, the reflectors having in particular concave mirror surfaces.

While in the case of a flat mirror surface an increase in intensity of the radiation incident at the target is achieved by addition of the radiation deflected by a plurality of reflectors, a further increase in intensity can be achieved with solar rays which are focused by the reflectors.

In a further embodiment of the present invention the target is adapted to deflect the solar rays deflected thereonto in a predetermined fashion. There is no need for the solar rays deflected on to the target to be used for energy conversion directly in the target, instead it is for example also possible for a plurality of apparatuses according to the invention to be combined, in which case the respective targets are so adapted that they irradiate a common 'hot spot'. If in addition for example a desired use presupposes an item of equipment which is too heavy or too bulky or unwieldy to be used directly as the target in the apparatus according to the invention, the deflected solar rays can be directed from the target of the apparatus according to the invention on to that item of equipment without movement of the item of equipment itself being necessary.

Advantageously in a further embodiment of the invention the target has at least one reflection element which focuses and/or deflects solar rays arriving from the reflectors to a useful element. For example in addition to or instead of focusing of the solar rays by the reflectors, such an increase in intensity CaO be achieved by focusing also with a suitable reflection element of the target. The useful element can also be arranged separately from the target.

In a further preferred embodiment of the invention the target is coupled to a thermal engine, in particular a hot gas turbine or a steam turbine, wherein the medium of the thermal engine is heatable by the deflected solar rays. For example it is possible by means of the deflected solar rays to evaporate water to give steam with which a steam turbine can be driven to generate electric power. It is also possible with the deflection of the solar rays on to the target to heat air or another gas with which a turbine can be driven in suitable fashion.

In accordance with a further embodiment of the present invention the target is coupled to a heat storage means, wherein the medium of the heat storage means is heatable by the deflected solar rays. It can be provided in that respect for example that for instance paraffin is heated to a temperature of between 100° C. and 150° C. by means of the deflected solar rays, in which case the thermal energy stored thereby in the paraffin can be taken from the paraffin again at another moment in time.

In a further advantageous embodiment the apparatus according to the invention further has the following features. A first reflector of the number of reflectors is provided for deflection of solar rays through a first plane angle out of a plane of the path of the sun and is coupled to a first axis. In this case the first axis is tilted and/or tiltable with respect to an orientation plane of the axis arrangement about a first axis angle, wherein the first reflector is tilted and/or tiltable with respect to the first axis about a first reflector angle. In this case the first axis angle is in opposite relationship to the first reflector angle and the first plane angle. In other words, this in a side view provides for example for deflection of the reflection of a horizontally incident solar ray in the anti-clockwise direction with a tilting movement of the first axis with respect to a vertical orientation plane in the clockwise direction and a corresponding tilting movement of the first reflector with respect to the first axis in the anti-clockwise direction (see also for example FIG. 17).

The orientation plane of the axis arrangement is a plane which is determined, preferably also geometrically, by the axis arrangement and which in operation is oriented in a predetermined fashion relative to the plane of the path of the sun. In the case of an apparatus as shown for example in FIG. 4a-4c, 5, 6 or 16, the orientation plane is the plane defined by the axes of the apparatus. If the axis arrangement is in the form of a flat carrier structure the orientation plane of that axis arrangement is preferably the plane defined by the carrier structure.

A flat mirror oriented perpendicularly to the presumed plane of the path of the sun reflects solar rays incident thereon in parallel relationship with that plane of the path of the sun in the same plane. A correspondingly oriented parabolic mirror for focusing solar rays focuses the solar rays incident thereon in a spot (region) which is also in the path of the sun. Therefore, with mirrors oriented in such a fashion, it is only possible to irradiate targets which are disposed jointly with the mirrors in a plane in parallel relationship with the path of the sun.

In an embodiment corresponding to claim 8 or claim 9 a part of the reflectors is tilted or tiltable with respect to the respective axis, the axis preferably being oriented perpendicularly to the plane of the path of the sun. With such tilted or tiltable reflectors, the solar rays can be deflected out of the apparent plane of the path of the sun, which makes it possible to co-ordinate a plurality of mutually superposed reflectors in such a way that the solar rays deflected thereby are incident on a target which is not disposed with the reflectors in a plane parallel to the plane of the path of the sun. It will be noted in this respect however that in this case, with a larger plane angle, that is to say greater deflection of the solar rays out of the plane of the path of the sun, that can involve a difficulty in focusing the reflected solar rays on the target. A solution thereto in accordance with the invention, as described for example hereinbefore, lies in suitable compensation by adaptation of the pivotal and tilting angles of the reflectors. It was now further found that surprisingly, even with a greater plane angle, good simple focusing can be achieved by the above-described tilting movement of the first axis which is associated with the first reflector in relation to the orientation plane of the axis arrangement, for example a plane perpendicular to the plane of the path of the sun, in particular a plane perpendicular to the direction of incidence of the solar rays, and tilting of the reflector with respect to the first axis.

The at least one further reflector of the apparatus according to the invention in this embodiment can in turn be arranged like the first reflector, that is to say also coupled to an axis which is tilted with respect to the axis arrangement and can be tilted with respect thereto, or can also be connected to an axis parallel to the orientation plane of the axis arrangement. The one further reflector or the further reflectors or the elements connected thereto of the apparatus can in particular also be designed as is set forth in claims 5 and 8 to 12.

In a further preferred embodiment of the present invention the apparatus has a second reflector as one of the reflectors, which is provided for deflection of solar rays through a second plane angle which differs from the first plane angle out of the plane of the path of the sun and is coupled to a second axis, wherein the second axis is tilted and/or tiltable with respect to the orientation plane of the axis arrangement through a second axis angle, wherein the second reflector is tilted and/or tiltable with respect to the second axis through a second reflector angle, and wherein the second axis angle is in opposite relationship to the second reflector angle and the second plane angle. Thus with the first reflector it is possible to achieve deflection through a first plane angle and with the second reflector a deflection through a second plane angle, whereby for example there are two or correspondingly more 'levels' of reflectors which by virtue of an adapted plane angle respectively orient the incident solar rays on to the common target.

In accordance with a further embodiment of the invention the reflector angle corresponds to the plane angle and the axis angle corresponds to an oppositely related half of the plane angle. In general the magnitude of the plane angle upon incidence of the solar rays perpendicularly to the orientation plane of the axis arrangement is equal to double the difference between the magnitudes of the axis angle and the reflector angle, as, with the tilting movement of the reflector and the axis, with the reflector unpivoted, there is an angle between reflector and orientation plane, that is equal to that difference. It was found that particularly good results can be achieved with the above-specified arrangement.

In a preferred embodiment the axis arrangement is so adapted that the orientation plane can be oriented by an inclination movement perpendicularly to a plane of the path of the sun. An orientation plane which is oriented perpendicularly to the path of the sun makes it possible to provide that the solar rays are particularly easily guided on to the target.

In another preferred embodiment of the present invention the axis arrangement has a multiplicity of axes and is so adapted that the axes are inclinable transversely relative to the orientation plane. If the axis arrangement in operation is so oriented that the axes are arranged in mutually juxtaposed relationship substantially in the East-West direction, wherein the reflectors are facing towards the sun, then the axes can be adapted to the change in the apparent plane of the path of the sun in the course of the year by inclination transversely relative to the orientation plane.

In a further embodiment of this invention the axis arrangement has a multiplicity of axes and is so adapted that the axes are inclinable parallel relative to the orientation plane. An axis arrangement oriented as previously described along the East-West direction has a comparatively small effective area in relation to the sun in the morning and the evening respectively. If now the effective area in relation to the sun is to be increased in the evening time or morning time or if orientation in the East-West direction is not possible, it is thus possible with an axis arrangement which allows inclination of the axes parallel to the orientation plane also to provide for orientation of the axis arrangement along a North-South direction in the extreme case, in which case the inclination of the axes can be adapted to the midday height of the sun or the inclination of the apparent plane of the path of the sun respectively.

Advantageously the axis arrangement can be so designed that it allows inclination of the axes both transversely and also parallel to the orientation plane.

BRIEF DESCRIPTION OF THE DRAWINGS

Individual aspects of the invention are described in greater detail hereinafter with reference to the accompanying drawings in which:

FIGS. 1a and 1b show views of an arrangement for deflecting solar rays on to a target, FIGS. 2a and 2b show views of a first embodiment of an apparatus according to the invention, FIG. 3 shows a view of a second embodiment of an apparatus according to the invention, FIGS. 12a and 12b show views to explain the relationships between incident and reflected light beams, FIG. 13 shows a view of an inclined mirror with associated axis, FIGS. 14a and 14b show views of a further aspect of the present invention, FIGS. 24a and 24b show views of an apparatus according to the invention in different orientations, and FIG. 25 shows a view of a further embodiment of the present invention.

DETAILED DESCRIPTION

Figure 4A:
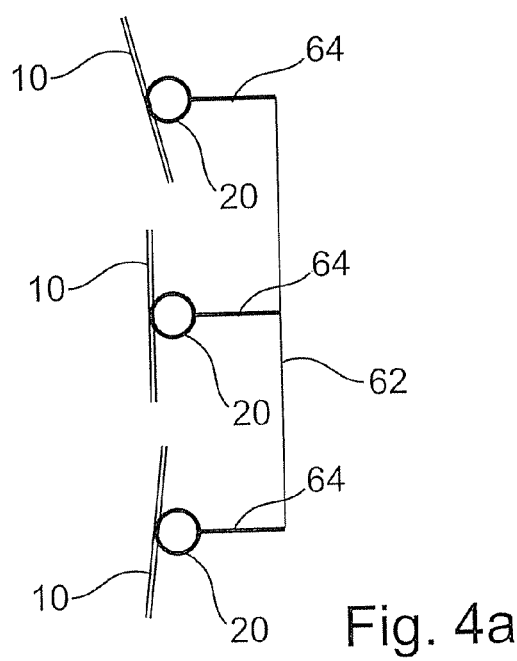
FIGS. 4a, 4b and 4c show views of a further aspect of an embodiment of the present invention.

In the accompanying drawings and the description relating to such drawings mutually corresponding elements are denoted by corresponding references.

FIG. 1a shows a mirror 10 arranged pivotably about an axis 20 to deflect solar rays 40 from the sun 30 on to a hot spot 50 as the target. The deflected solar rays are denoted by reference 40'.

FIG. 1b shows a situation corresponding to FIG. 1a, wherein the sun 30 has assumed a different position relative to the arrangement of mirror 10, axis 20 and target 50.

In FIGS. 1a and 1b the plane of the drawing coincides with the (apparent) path of the sun, wherein the axis 20 around which the mirror 10 is arranged pivotably is perpendicular to the plane of the drawing.

The mirror 10 which is rotatable or pivotable about the axis 20 can be moved with a tracking movement during the course of the day in such a way that it always throws the sunlight 40 incident thereon on to the hot surface 50 which is stationary relative to the axis 20.

The two FIGS. 1a and 1b show positions of the sun at different times of the day and the corresponding position of the mirror relating thereto.

FIG. 2a shows a first embodiment of an apparatus 100 according to the invention with an axis 20 and reflectors 10, 12 arranged pivotably about the axis 20. The mirrors 12 are inclined with respect to the axis 20 so that incident solar rays 40 are respectively deflected by the mirrors 10, 12 on to the hot surface 50 as deflected rays 40'.

FIG. 2b shows an arrangement similar to that shown in FIG. 2a, in which respect however all mirrors 12 are inclined relative to the axis 20 so that the hot surface 50 as the target is arranged outside the beam paths of the incident rays 40.

In FIGS. 2a and 2b the plane of the path of the sun is perpendicular to the plane of the drawing and is parallel to the incident rays 40. Accordingly, as is already the case in FIG. 1, the axis 20 is perpendicular to the plane of the path of the sun. FIGS. 2a and 2b essentially differ only by virtue of the arrangement of the hot surface 50 relative to the mirrors and the mirrors 12 which are correspondingly tilted differently relative to the axis 20. The arrangement in FIG. 2a means that, if the sun (not shown in FIG. 2a), the hot surface 50 and the mirror 10 are disposed on a line, the hot surface 50 throws a shadow on to the apparatus 10. Such shadowing does not occur in the arrangement as shown in FIG. 2b.

FIG. 3 shows a second embodiment of an apparatus 100 according to the invention, wherein three mirrors 10 are arranged in mutually juxtaposed relationship and are pivotable about respective axes 20, wherein the mirrors 10 in turn are no arranged that the incident solar rays 40 are deflected on to the hot surface 50. As is also the case in FIGS. 1a and 1b, in FIG. 3 the plane of the path of the sun coincides with the plane of the drawing.

Figure 4B:
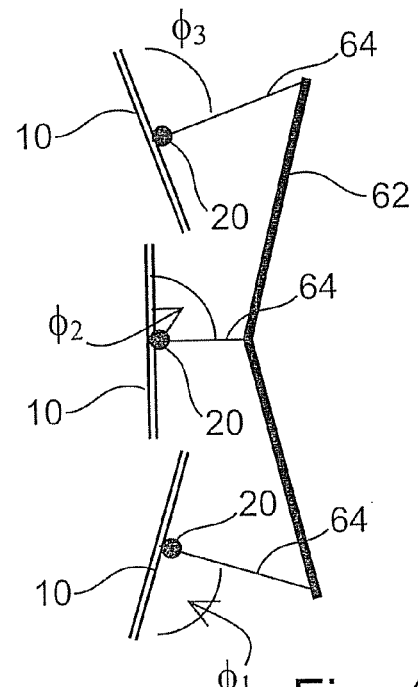

FIG. 4a shows a further aspect of an embodiment of the present invention. Similarly to the FIG. 3 arrangement there are three parallel axes 20, wherein mirrors 10 are respectively arranged pivotably about those axes. In addition there is a pivotal drive system for joint pivotal movement of the mirrors 10 about the respective axis 20. The pivotal drive system has a bar 62 which is respectively connected by way of levers 64 to the combination of mirror 10 and axis 20 so that displacement of the bar 62, by way of the levers 64, causes a corresponding pivotal movement of the mirrors 10 about the axes 20. The axes 20 with the associated mirrors 10 are thus connected by way of the bar 62 and the levers 64 in such a way that a single motor is sufficient to keep all mirrors 10 suitably oriented in relation to the sun (not shown) in the course of the day so that the reflected light always shines on the hot surface (not shown in FIG. 4a). In the FIG. 4a arrangement all three axes 20 perform rotary movements through the same angle. If the levers 64 are of differing lengths, as shown in FIG. 4b, the rotary movements take place through corresponding different angles. A rotary movement for example of the central mirror through an angle $\Delta\Phi_2$ therefore involves a rotary movement of the upper mirror through a smaller angle $\Delta\Phi_3$, and the rotary angle $\Delta\Phi_3$ is therefore not equal to the rotary angle $\Delta\Phi_2$ but is a function of the rotary angle $\Delta\Phi_2$, which can be implemented by suitable suspension for the mirrors. Corresponding suspension arrangements are basically known to the man skilled in the art and in that respect a detailed description of the large number of possible suspension arrangements will not be included here.

Figure 4C:
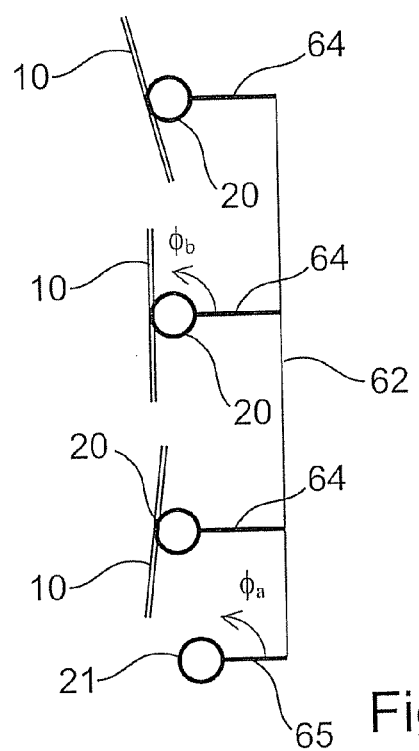

In a similar manner it is possible for a plurality of mirrors associated with a common axis (see for example mirrors 10, 12 in FIG. 2a or FIG. 2b) to be pivoted independently of each other about respective mutually different angles, especially as there is no need for all mirrors associated with a common axis to be pivoted through identical angles. The FIG. 4c arrangement has an additional axis 21 connected by way of a lever 65 to a mirror arrangement similarly to FIG. 4a. As a result of the different length of the levers 64, 65, a rotary movement of the axis 21 through an angle $\phi_a$ provides a pivotal movement of the mirrors 10 respectively through an angle $\phi_b$ which differs from the angle $\phi_a$. If a plurality of arrangements as are shown in FIG. 4c are arranged for example in mutually superposed relationship in the form of 'levels', so that for each respective one of the axes 20 in FIG. 4c there is an arrangement similar to those in FIG. 2a or FIG. 2b, the mirrors of a 'level' can be respectively actuated jointly by way of the axis 21. If in that case levers 65 of respectively different lengths are provided for different 'levels', a plurality of mirrors, although associated with an axis (see FIGS. 2a and 2b), are pivoted through respectively different angles according to their 'level'.

It will be appreciated that alternatively or supplemental to the lever systems described herein it is also possible to use other structures, for example gear wheels and/or belts.

Figure 5:
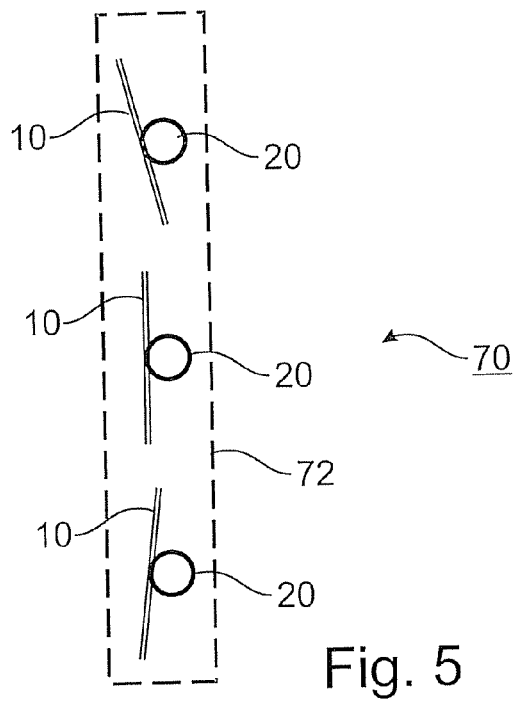
FIG. 5 shows a view of an axis arrangement according to an aspect of the present invention.

FIG. 5 shows an axis arrangement 70 according to an aspect of the invention having three axes 20 which are arranged in parallel and with each of which there is associated a respective mirror 10 arranged pivotably about the respective axis 20. The axis arrangement 70 also has a frame 72 in which the axes 20 are arranged. The view in FIG. 5 corresponds to a view in the longitudinal direction of the axes.

Figure 6:
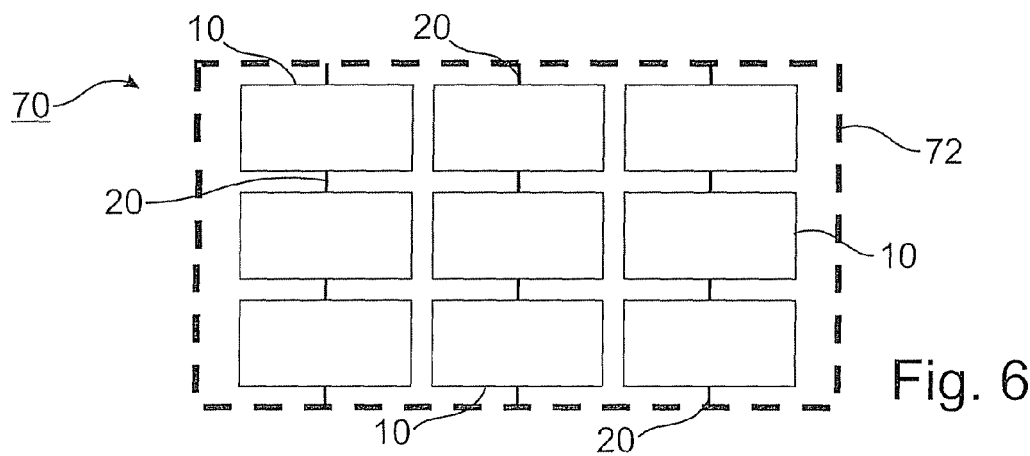
FIG. 6 shows a different view of the axis arrangement of FIG. 5, FIGS. 7a and 7b show views of an apparatus according to the invention in a different orientation.

FIG. 6 shows the axis arrangement 70 with the axes 20, the corresponding mirrors 10 and the frame 72 of FIG. 5, in a view on to a plane parallel to the axes 20. The axis arrangement 70 has three axes 20, with each of which three mirrors 10 are respectively associated so that the axis arrangement 70 has a total of nine mirrors. In the axis arrangement 70 shown in FIG. 6 the axes 20 are at a right angle to the lower part of the frame 72. An apparatus according to the invention having such an axis arrangement 70 could be easily set up on flat ground, for reasons of simplicity and thus a cost saving, so that the lower part of the frame 72 is horizontal, as indicated in FIG. 6.

Figure 7A:
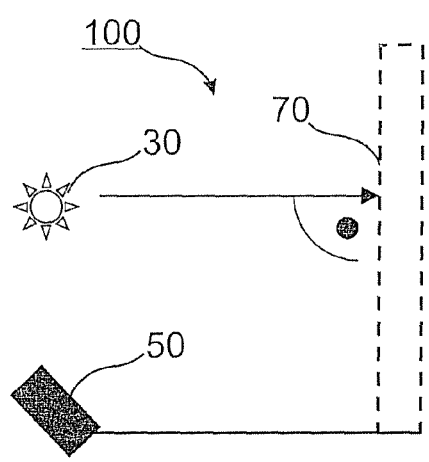
Figure 7B:
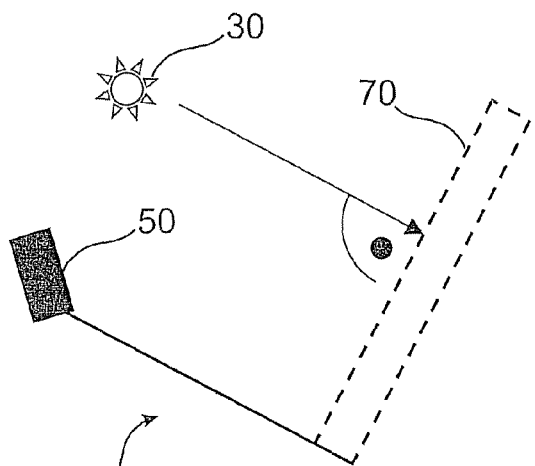

FIGS. 7a and 7b each show an apparatus 100 according to the invention with an axis arrangement 70 with a target 50 coupled thereto in different orientations. In FIGS. 7a and 7b the coupling between the target 50 and the axis arrangement 70 involves a simple mechanical connection. In the FIG. 7a view the (apparent) plane of the path of the sun is perpendicular to the plane of the drawing, as indicated by the solar ray 40 which is incident on the axis arrangement 70 at a right angle. FIG. 7b shows an axis arrangement which is inclined relative to the view in FIG. 7a, with a correspondingly moved target 50 so that the axis arrangement 70 and the target 50 are set to the altered plane of the path of the sun.

Figure 8:
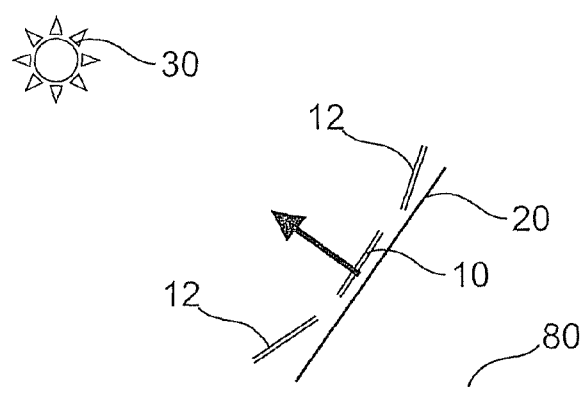
FIG. 8 shows a view of a further embodiment of the present invention.

FIG. 8 shows an embodiment of the present invention with an axis 20 and mirrors 10, 12 pivotable about that axis, wherein the axis 20 as a component part of an axis arrangement is so inclined with respect to the horizontal ground 80 that a vector which is perpendicular to the axis 20 (indicated by the arrow in FIG. 8) is directed towards the sun 30. The mirrors 12 are inclined similarly to FIGS. 2a and 2b with respect to the axis 20 so that solar rays reflected by the mirrors 10, 12 (these are not shown here) come together in a region between the sun 30 and the axis 20 and are incident on a target (not shown).

In the case of an axis arrangement as shown in FIG. 6 the arrow illustrated in FIG. 8 corresponds to a normal vector relative to a plane defined by the frame 72 or the axes 20 respectively. In the Northern hemisphere that normal vector would therefore be oriented towards the South when the arrangement 70 involves an East-West orientation.

In the above-described embodiments of the present invention the reflectors are formed by flat mirrors 10. Alternatively or supplemental to flat mirrors it is also possible to use concave mirrors or reflectors which permit higher concentration of the solar radiation and also make it possible to produce a parallel light beam from the reflected solar rays 40', insofar as the concentrated light 40' reflected by the concave mirrors 10 is reflected at a further convex or concave mirror 50, as shown in FIGS. 9 and 10.

Figure 9:
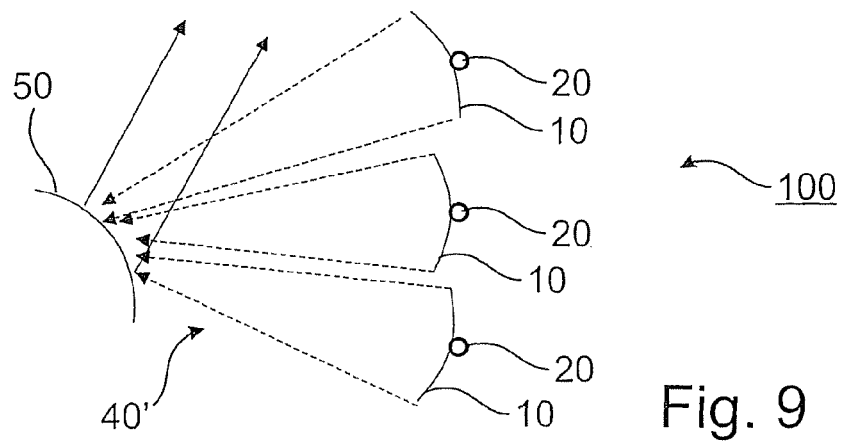
FIGS. 9 to 11 show views of further embodiments of the present invention with concave mirrors.

FIG. 9 shows an arrangement having three concave mirrors 10 arranged pivotably about respective axes 20. The mirrors 10 are so oriented that incident solar rays (not shown in FIG. 9) are deflected and concentrated towards the target 50. The target 50 comprises a convex mirror which reflects the reflected solar rays 40' in such a way that they are deflected to provide a parallel light beam.

Figure 10:
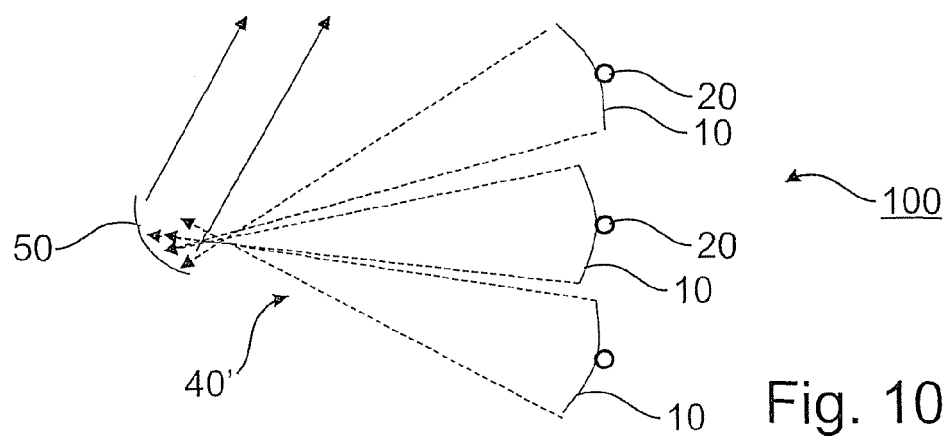

The view in FIG. 10 substantially corresponds to the view in FIG. 9, in which case the target 50 is formed by a concave mirror which also orients in parallel relationship the solar rays 40' deflected by the mirrors 10.

Figure 11:
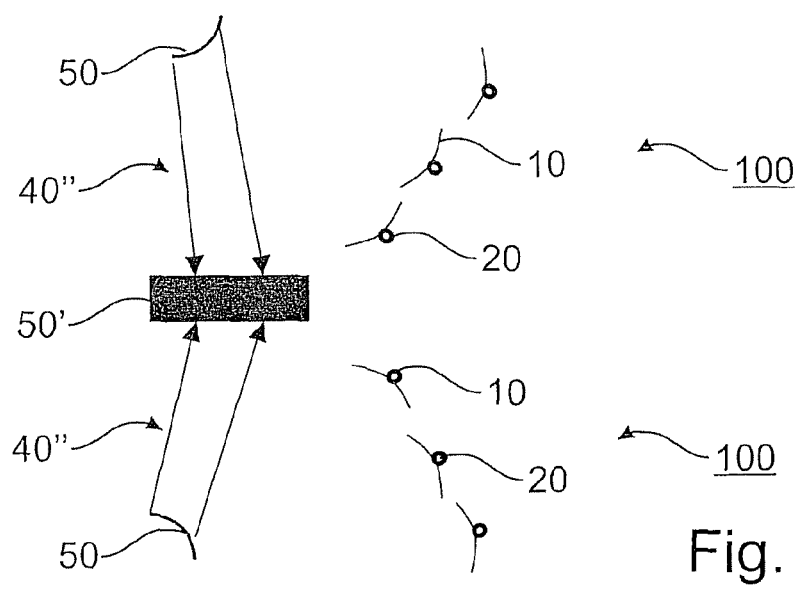

In FIG. 11 two of the arrangements shown in FIG. 9 are combined, the targets 50 being so oriented that the solar rays 40" deflected thereby are incident on a common target 50'.

The different reflectors or mirrors are shown in FIGS. 9 to 11, with substantially identical radii of curvature. It will be noted however that different radii of curvature can also be provided for different mirrors when implementing the present invention.

FIG. 12a shows a mirror 10 with a normal vector 15 which is perpendicular to the mirror surface, and incident and reflected sunlight 40, 40'. In the FIG. 12a view the plane of the path of the sun is in the plane of the drawing. The projection of the angle between the normal vector 15 and the incident solar ray 20 on to the orbital plane of the sun is denoted by $\alpha$. The projection of the angle between the normal vector 15 and the reflected solar ray 40' on to the orbital plane of the sun is denoted by $\alpha'$.

As long as the normal vector 15 is parallel to the orbital plane of the sun and the mirror 10 is therefore oriented perpendicularly to the (apparent) orbital plane or plane of the path of the sun, $\alpha$ and $\alpha'$ are identical and the reflected ray 40' is in the plane of the orbit of the sun.

FIG. 12b shows an inclination of the mirror 10 relative to the plane of the path of the sun, which is afforded from the incident solar ray 40. In the FIG. 12b view the plane of the drawing is perpendicular to the plane of the orbit of the sun. The inclination of the mirror corresponds to the angle between the normal vector 15 on the surface of the mirror 10 and the incident solar ray and is denoted in FIG. 12b by $\beta$. If the projection of the normal vector 15 on to the plane of the path of the sun and the incident light beam 40 are parallel the angle $\beta$ between the normal vector 15 and the incident light beam 40 corresponds to the angle $\beta'$ between the normal vector and the reflected light beam 40'.

If the above-described special cases do not apply, then generally there will no longer be any identity between $\alpha$ and $\alpha'$, and $\beta$ and $\beta'$ respectively, in which case the differences between $\alpha$ and $\alpha'$ and $\beta$ and $\beta'$ respectively depend on $\alpha$ and $\beta$. For example for $\alpha=30°$ and $\beta=15°$ $\alpha$ and $\alpha'$ and also $\beta$ and $\beta'$ respectively differ by about 4° from each other.

If an apparatus according to the invention only has a multiplicity of mirrors which, as shown for example in FIG. 6, are arranged both in mutually juxtaposed relationship and also in superposed relationship, inclination of the mirrors with respect to the respective axis 20 is required in order to hit a common target 50 with the reflected solar rays 40' as shown in FIGS. 2a and 2b.

A mirror 12 inclined in that way is shown in FIG. 13, wherein the angle between the inclined mirror 12 and the associated axis 20 is denoted by $\phi$. The solar ray incident from the sun 30 is deflected out of the plane of the path of the sun as a result of the inclination of the mirror 12 and is denoted by reference 40'.

If in orienting an axis arrangement or the reflectors associated with the axis arrangement the dependency of the direction of reflection on the angles $\alpha$ and $\beta$ is not included, then in dependence on the geometry of the apparatus according to the invention that can mean that not all solar rays deflected by the reflectors are incident in a common region. In the example of flat mirrors the result of this can be that, although the area irradiated by an individual mirror is not larger than the mirror area, the area illuminated by the arrangement of mirrors is nonetheless larger than the individual mirror area, and the respective individual areas therefore only partially overlap.

In an embodiment of this invention the target 50 has a useful element 50', on to which solar rays deflected by the reflectors or mirrors of the apparatus according to the invention are respectively focused or deflected by means of a reflection element 90.

In FIG. 14a, arranged beside the useful element 50' are two mirrors 90 which deflect sunlight 40' which is deflected by the reflectors and which is not directed directly on to the useful element 50' so that solar rays 40" which have been deflected again are incident on the useful element. FIG. 14b shows a further embodiment in which there is a focusing mirror 90 which deflects deflected solar rays 40' which go past the useful element 50' so that the solar rays 40" which are deflected again are incident on the useful element 50'.

In addition it can be provided that the reduction element or elements according to the invention are arranged movably and the position thereof can alter in the course of the day so as to permit optimised deflection on to the useful element.

Alternatively or supplemental to the foregoing description it can be provided according to the invention that the dependency of the direction of reflection on the orientation of the reflectors is also taken into consideration in terms of orientation of the reflectors so as to provide for suitable compensation. That can be afforded for example by a suitable transmission device as is shown for example in FIG. 4b. Likewise it is possible to provide for compensation of a plane in perpendicular relationship to the plane of the orbit of the sun. With a suitable transmission device, tracking of the reflectors in accordance with the position of the sun in the course of the day for individual mirrors can be such that the areas illuminated by the individual mirrors overlap each other to a relatively great degree or even completely and that therefore provides for better or complete 'focusing'. If necessary, continual focusing of the system can be achieved by simple mechanical compensating mechanisms.

In this respect the movement of the individual mirrors can remain coupled, in which case, as a consequence of the transmission device, individual mirrors however perform different movements.

Figure 15:
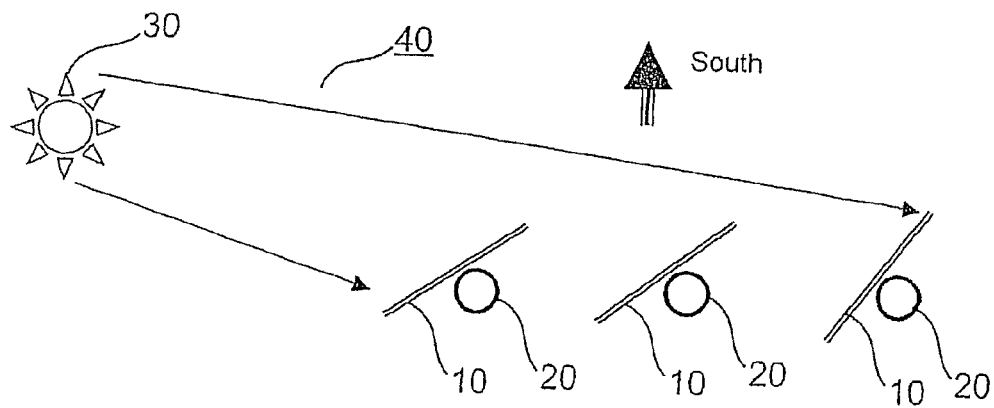
FIG. 15 shows a view to explain the incidence of light at the morning time and evening time respectively in the case of an axis arrangement oriented towards the South.

FIG. 15 shows an embodiment of the present invention in which the axis arrangement of the axes 20 with the corresponding mirrors 10 is oriented in the East-West direction so that a normal vector relative to a plane determined by the axes 20 points towards the South. As indicated in FIG. 15 the sun 30 in the morning and in the evening is at a large angle to the normal vector of the arrangement so that in such a case the apparatus has only a comparatively small effective area, in relation to the incident solar rays 40.

Figure 16:
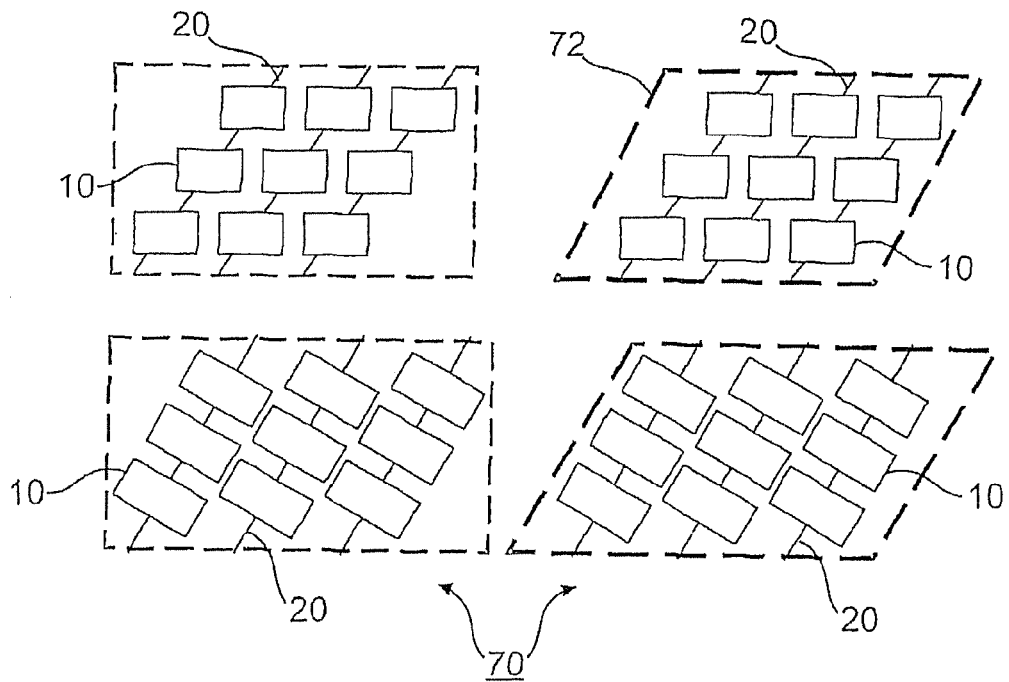
FIG. 16 shows a view of axis arrangements according to the invention, with axes inclined in the plane defined by the axes.

FIG. 16 illustrates axis arrangements suitable for affording the largest possible effective area to the respectively incident solar rays even in the morning and the evening so that it is possible to use more solar energy. In this case the axes 20 are no longer perpendicular on the lower part of the frame 72, the axes 20 and the frame 72 being of such a configuration that the angle included between them can be adapted to the midday height of the sun, which changes in the course of the year, by an inclination along the frame 72.

Figure 17:
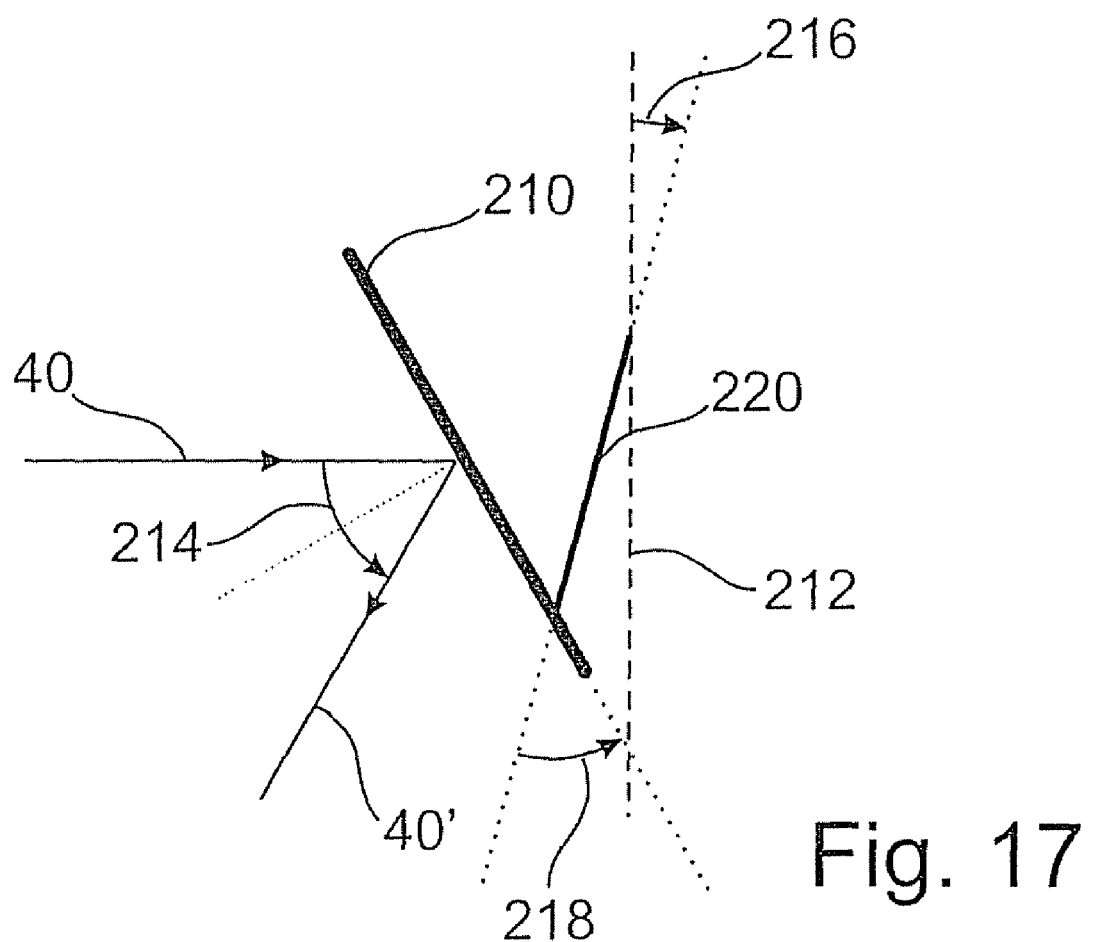
FIG. 17 shows a view of a further aspect of an apparatus according to the invention.

FIG. 17 shows a view of a further aspect of an apparatus according to the invention. The flat mirror 210 is pivotably coupled to the axis 220 which in turn is connected to an axis arrangement (not shown). The mirror 210 is tilted with respect to the axis 220 through a reflector angle 218, that is to say in the anti-clockwise direction in the FIG. 17 view. The axis 220 is in turn tilted through an axis angle 216 with respect to the orientation plane 212 of the axis arrangement (not shown), with the direction of tilting of the axis 220 with respect to the orientation plane 212 being opposite to the tilting direction of the mirror 210 with respect to the axis 220, that is to say in the FIG. 17 view the axis 220 is tilted in the clockwise direction with respect to the orientation plane 212. In the FIG. 17 view therefore the mirror 210 is at a tilt angle relative to the orientation plane 212, which results from the difference in the magnitudes of the reflector angle 218 and the axis angle 216. In addition FIG. 17 shows a solar ray 40 which is incident perpendicularly to the orientation plane 212 and which is reflected by the mirror 210, the reflected solar ray 40' including a plane angle 214 with the incident solar ray 40, the magnitude of which is twice as large as the tilt angle through which the mirror 210 is tilted with respect to the orientation plane 212 as the plane 212 is oriented perpendicularly to the plane of the path of the sun. That plane is perpendicular to the plane of the paper in the FIG. 17 view. Even upon a pivotal movement of the mirror 210 about the axis 220 in the course of a day, to adapt the position of the mirror to the (apparent) movement of the sun, the arrangement according to the invention makes it possible very substantially to maintain an orientation of the reflected ray 40' on to the target (not shown). The reflected solar rays 40' are no longer in the plane of the path of the sun so that the target which is thus also no longer arranged in the plane of the path of the sun for the mirror 210 does not throw any shadow on to the mirror 210, as could happen if the mirror and the target are in a common plane with the sun.

Figure 18:
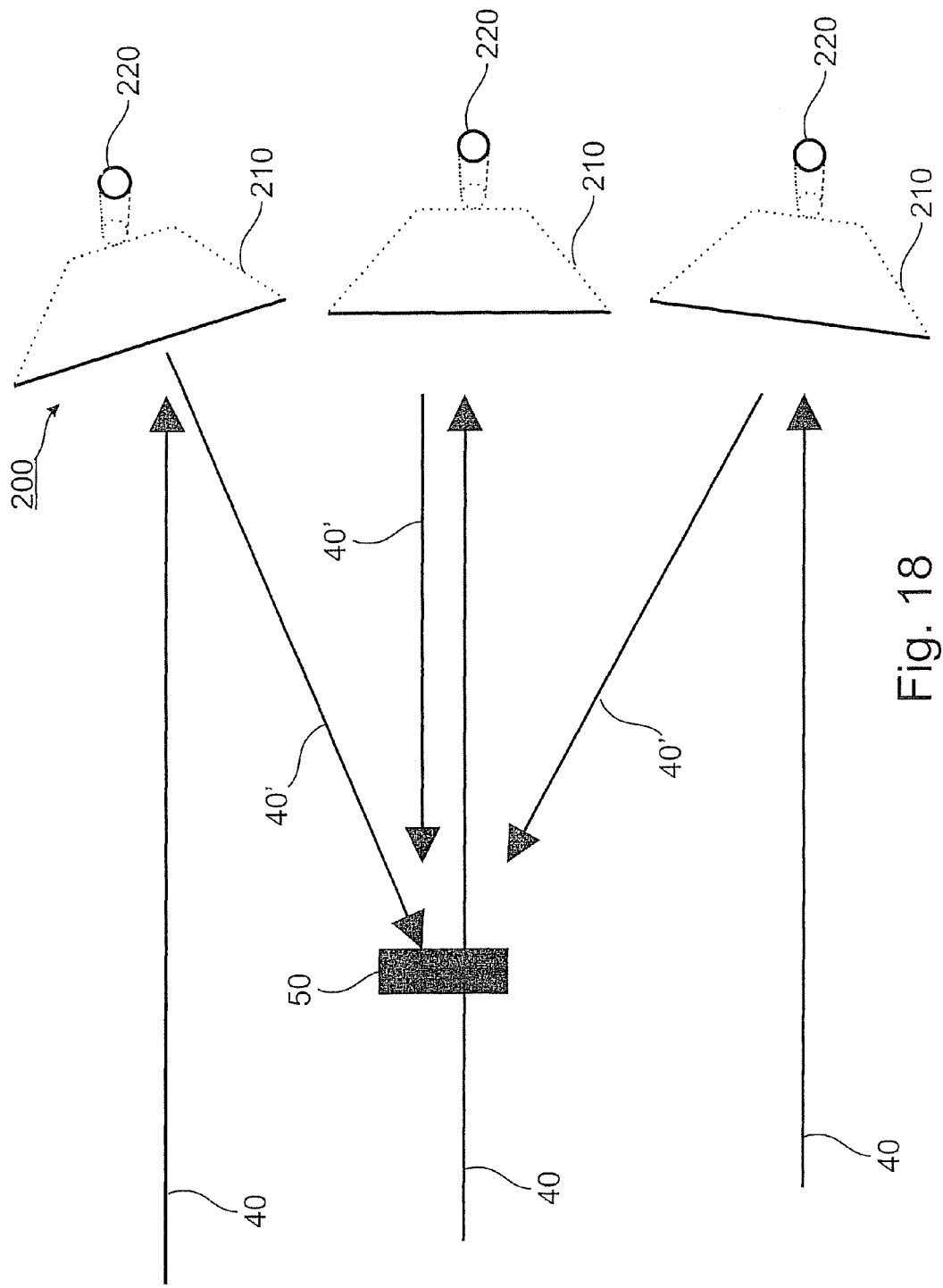
FIG. 18 shows a view of a further embodiment of the apparatus according to the invention.

FIG. 18 shows an embodiment of the apparatus 200 with respectively three axes 220 and three mirrors 210 arranged pivotably about a respective axis 220. The mirrors 210 are tilted with respect to the corresponding axis 220 and so arranged or pivoted that incident solar rays 40 are respectively deflected by the mirrors 210 on to the hot surface 50 in the form of deflected rays 40'. The tilt or reflector angle of the mirrors 210 with respect to the axes 220 is indicated by the diagrammatic perspective view (dotted line). The axes 220 are in turn tilted with respect to the orientation plane (not shown in FIG. 18) about an axis angle in the direction of incidence of the solar rays 40, that tilting movement being indicated also by a corresponding perspective view (dotted line). The mirrors 210 are thus also tilted with respect to the orientation plane of the axis arrangement (not shown) whereby the solar rays 40 which are incident in the (supposed) plane of the path of the sun which coincides with the plane of the drawing are deflected out of the plane of the path of the sun. Accordingly the target 50 is also not in the plane of the drawing in FIG. 18.

Figure 20:
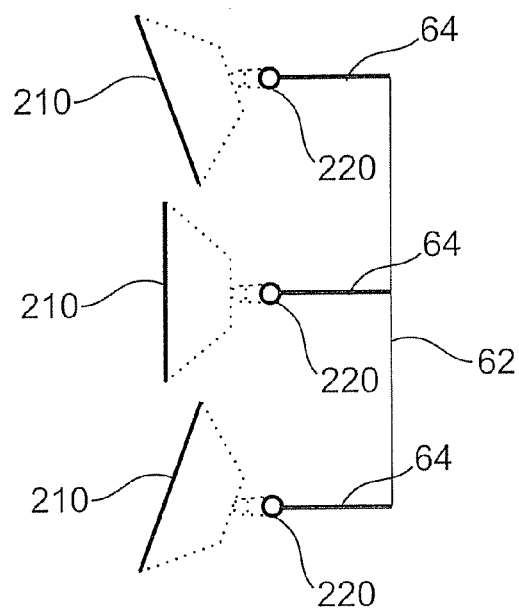
FIG. 20 shows a view of a further aspect of an apparatus according to the invention.

FIG. 20 shows a further aspect of an embodiment of this invention. Similarly to the FIG. 18 arrangement there are three parallel axes 220, wherein mirrors 210 are respectively arranged pivotably about those axes 220. In addition there is a pivotal drive system for common pivotal movement of the mirrors 210 about the respective axis 220. The pivotal drive system has a bar 62 connected by way of respective levers 64 to the combination of mirror 210 and axis 220 so that displacement of the bar 62, by way of the levers 64, causes corresponding pivotal movement of the mirrors 210 about the axes 220. The axes 220 with the associated mirrors 210 are thus connected by way of the bar 62 and the levers 64 so that a single motor is sufficient to keep all mirrors 210 suitably oriented towards the sun (not shown) in the course of the day so that the reflected light always illuminates the hot surface (not shown in FIG. 20). In the FIG. 20 arrangement all three axes 220 respectively perform rotary movements through the same angle.

If the levers 64 are of different lengths the rotary movements take place through corresponding different angles, which can be implemented by suitable suspension means for the mirrors. Corresponding suspension means are basically known to the man skilled in the art and in that respect a detailed description of the large number of possible suspension arrangements will be dispensed with here.

It is also possible to provide an additional axis connected by way of a further lever to the mirror arrangement similarly to FIG. 20. As a consequence for example of differing lengths for the levers, upon a rotary movement of the axis through an angle φa, that involves a pivotal movement of the mirrors through a respective angle φb which differs from the angle φa. If a plurality of such arrangements are disposed for example in mutually superposed relationship as 'levels', then the mirrors of a 'level' can be respectively actuated jointly by way of the axis.

It will be appreciated that alternatively or supplemental to the lever systems described here it is also possible to use other structures, for example gear wheels and/or belts.

Figure 22:
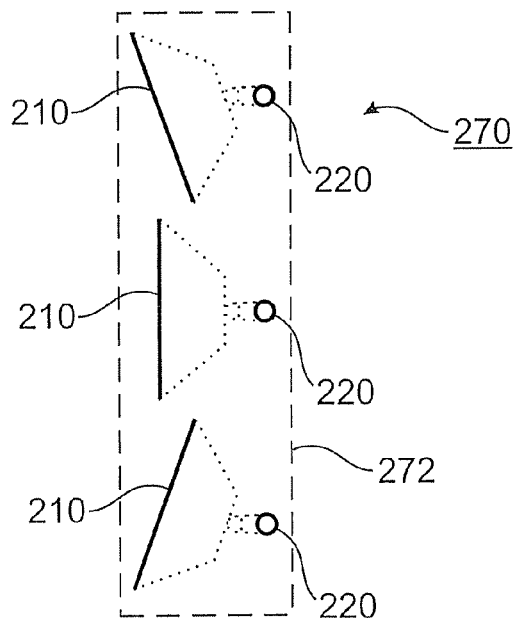
FIG. 22 shows a view of an axis arrangement according to an aspect of the present invention.

FIG. 22 shows an axis arrangement 270 according to an aspect of the invention with three axes 220 which are arranged in parallel and with each of which is associated a respective mirror 210 arranged pivotably about the respective axis 220. The axis arrangement 270 also has a frame 272 in which the axes 220 are arranged. The view in FIG. 22 corresponds to a view parallel to the orientation direction of the axis arrangement 270. In the FIG. 22 embodiment the carrier structure afforded by the frame 272 also determines the orientation plane (not shown) of the axis arrangement 270, in which case the orientation plane in the FIG. 22 view is perpendicular to the plane of the drawing and parallel to the longitudinal direction (viewing from above downwardly) of the view of the frame 272. It will be appreciated that other arrangements are also possible, in which respect in particular there is no limitation to symmetrical configurations.

Figure 19:
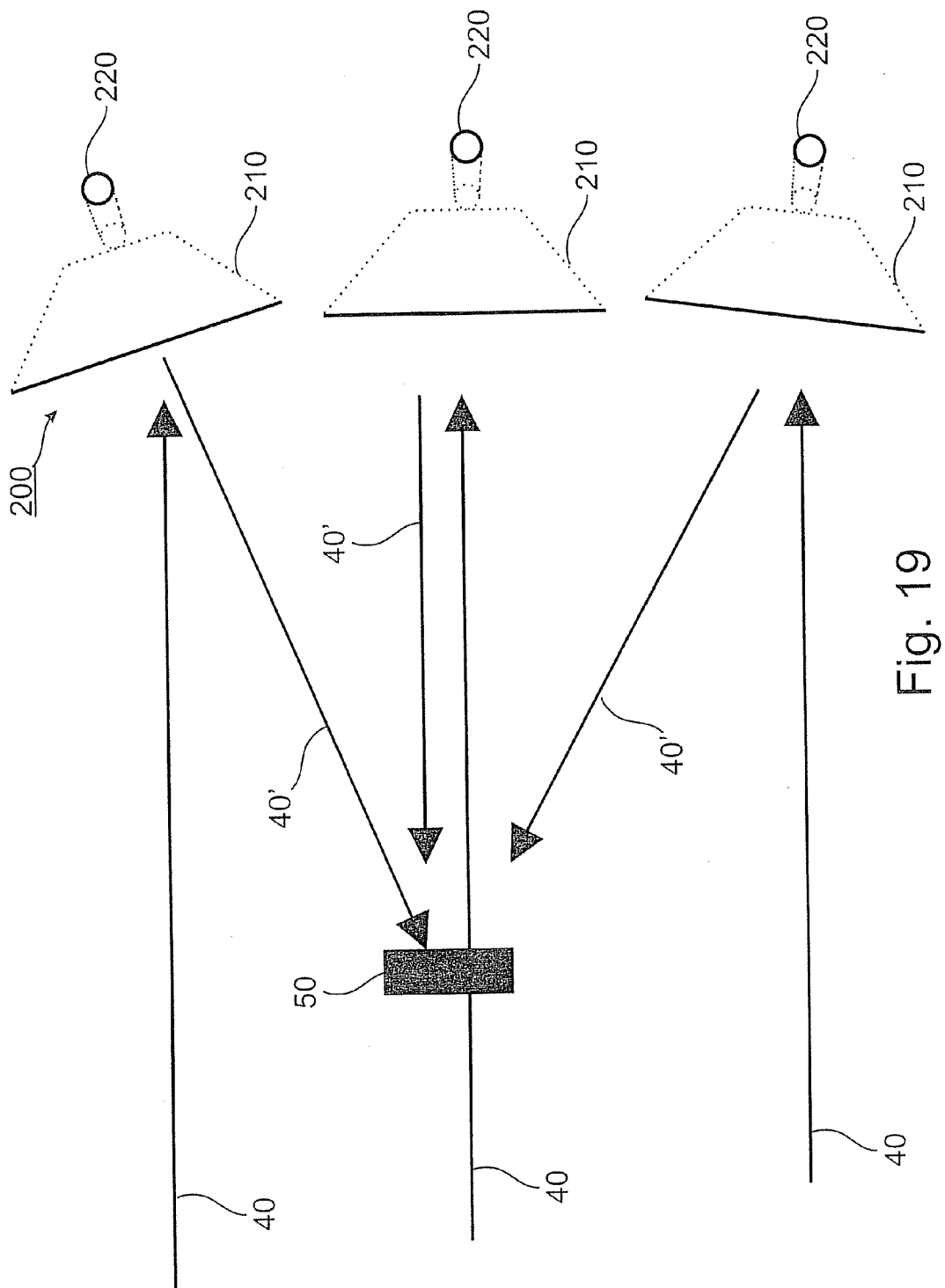
FIG. 19 shows a view of a modification of the FIG. 18 embodiment.
Figure 21:
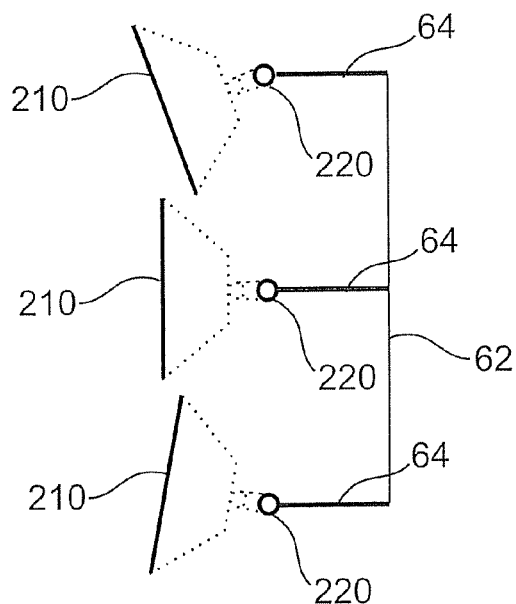
FIG. 21 shows a view of a modification of the FIG. 20 aspect.
Figure 23:
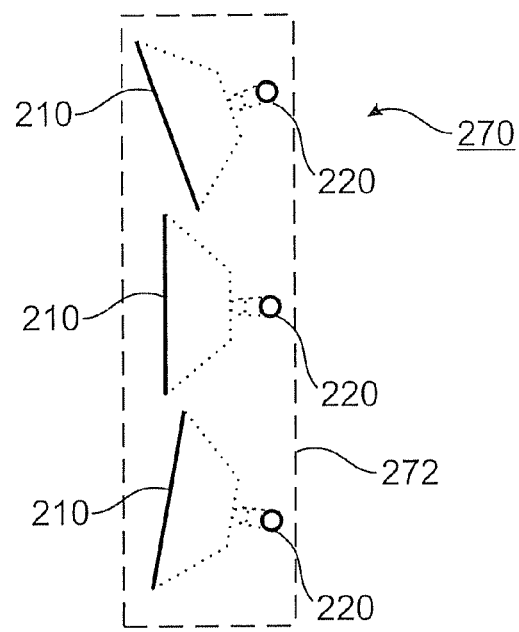
FIG. 23 shows a modification of the FIG. 22 axis arrangement.

The aspects or embodiments shown in FIGS. 19, 21 and 23 differ from those in FIGS. 18, 20 and 22 only insofar as the axes 220 are tilted in respective axis tilt planes with respect to the orientation plane (here perpendicular to the incident solar rays), which are not parallel for the illustrated axes 220 of a plane. The axes 220 are here respectively tilted in their own axis tilt plane, in which respect an axis tilt plane is defined in each case by a (hypothetical) untilted axis (which in FIGS. 19, 21 and 23 would be perpendicular to the plane of the drawing) and the tilted axis 220. In other words it can be said that the respective axes 220 are tilted with respect to the orientation plane (not shown here) with an axis angle which (depending on the respective axis 220), in addition to the polar component (that is to say a tilt angle in the axis tilt plane), involves an azimuthal component (that is to say an orientation in the plane of the drawing in FIGS. 19, 21 and 23, corresponding to a rotation of the axis tilt plane). The azimuthal component is zero in the views in FIGS. 18, 20 and 22. In the views in FIGS. 19, 21 and 23 the axes 220 are respectively oriented in the azimuth on to the focal point or target 50. Other orientations, for example with an azimuthal component which is in comparison larger or small, are also possible.

FIGS. 24a and 24b each show an apparatus 200 according to the invention with an axis arrangement 270 with a target 50 coupled thereto in different orientations. In FIGS. 24a and 24b the coupling between the target 50 and the axis arrangement 270 is a simple mechanical connection. In the FIG. 24a view the (apparent) plane of the path of the sun is perpendicular to the plane of the drawing, as indicated by the solar ray 40 which is incident on the orientation plane of the axis arrangement 270 at a right angle. FIG. 24b shows an axis arrangement which is inclined with respect to the FIG. 24a view, with a correspondingly moved target 50, so that the axis arrangement 270 and the target 50 are set to the modified plane of the path of the sun.

FIG. 25 shows an embodiment of this invention. The apparatus 200 includes an apparatus with mirrors 10 and axes 20, similarly to FIG. 8, with the axes 20 being oriented perpendicularly to a direction of incidence of the solar rays from the sun 30. It will be noted however that FIG. 5 only shows in cross-section one axis 20 with a corresponding mirror 10. The axis 20 as a component of an axis arrangement is so inclined with respect to the horizontal ground 80 that a vector perpendicular to the axis 20 (the vector is indicated by the arrow in FIG. 25) is oriented towards the sun 30. The apparatus 200 shown in FIG. 25 further includes mirrors 210 which are each tilted with respect to a respective corresponding axis 220, wherein the corresponding axes 220 are in turn respectively tilted with respect to the orientation plane 212 defined by the axis arrangement. The resulting tilting of the mirrors 210 with respect to the orientation plane 212 (and thus also with respect to the mirror 10) provides that the solar rays reflected by the mirrors 10, 210 converge and are incident on a target (not shown).

BY way of example flat mirrors are provided in the embodiments described with reference to FIGS. 17 to 25. Other forms of mirrors and kinds of reflectors however are also possible in accordance with the invention, for example corresponding to the structures shown in FIGS. 9 to 11. The same applies to the description relating to the configuration of the target, in particular in relation to FIGS. 9 to 11, 14*a* and 14*b*.

In the accompanying drawings, for the sake of simplification thereof, the axes are respectively arranged centrally in relation to the corresponding reflectors. According to the invention however it is also possible to provide a different arrangement as long as pivotal movement of the reflectors about the respective axis is possible.

The present invention provides an apparatus for and a method of utilising solar energy, which allow a construction which is less expensive in comparison with known methods and apparatuses.

In an advantageous embodiment the invention provides an apparatus for and a method of using solar energy, in which neither a single one of large mirrors overall has to be moved, nor does a large number of small mirrors each in itself have to be rotated about a respectively different axis or about two axes, but a plurality of mirrors or reflectors are rotated on for example mutually parallel axes (see for example FIG. 3 or FIG. 6), thereby permitting a construction which is less expensive in comparison with known methods and apparatuses: a square meter of flat mirrors costs about €30.00. The frame in which the axes are held costs about €50.00 per square meter, and to that there are added the axis, some minor parts, a stepping motor with a microprocessor in a sum total of about €100.00 to €150.00 for material costs. Added to that is about €50.00 for assembly. If a square meter of mirror area collects about 500 kilowatt hours per year, in 10 years that gives 5,000 kilowatt hours, thus giving a price of about €0.04 per kilowatt hour which approximately corresponds to the price of energy from oil or gas.

In an embodiment by way of example of the present invention the rotary or pivot axis of each mirror is not identical to an axis which is perpendicular to the path of the sun and it is also not parallel to that axis. It will be noted however that the mirror is connected by way of the axis to an arrangement defining a plane which is preferably perpendicular to the direction of incidence of the solar rays. The rotary or pivot axis of the mirror tilts through an angle α and the mirror is so mounted on that axis that it forms therewith an angle 2·α. In that way the mirror surface faces downwardly or upwardly to a greater degree when the mirror rotates or pivots. The mirror is lowered (or raised) somewhat in the rotary movement (pivotal movement) and thus deflects the light downwardly (or upwardly respectively) to a greater degree.

Only two axes are moved by a respective motor: one motor holds the arrangement with the axes to which the mirrors are mounted perpendicularly to the path of the sun in the course of the year, in which case at least some of the axes are themselves not oriented perpendicularly to the path of the sun as they are tilted with respect to the orientation plane of the axis arrangement. A second motor rotates the mirrors about those axes during the day.

In the case of a simple tilting movement of mirrors with respect to an axis which is perpendicular to the (apparent) plane of the path of the sun, the problem which arises is that light reflected thereby is in general not at the same angle as the incident light, both in the plane of the sun and also perpendicularly thereto, so that focusing by joint orientation of the mirrors towards a target is found to be difficult.

If for example the mirror is to be inclined through 5° so that it deflects the light downwardly through 10°, then in an embodiment the axis of mirror rotation is inclined upwardly through 5° (with respect to a mounting plane), in which case at the same time the angle between that axis and the mirror is set to 10° so that in turn the mirror points downwardly by the required 5° (with respect to the mounting plane). In an embodiment a mirror can be mounted in correspondingly tilted relationship at a flap of a conventional hinge, in which case the other flap of the hinge is fixed to a mounting frame so that the hinge axis is tilted with respect to the mounting frame.

In comparison with conventional systems such as parabolic mirror systems (with a three-dimensional mirror curvature), parabolic trough-like systems (with a two-dimensional mirror curvature) and solar towers, the invention affords simplifications in that it is possible to use less expensive flat mirrors, there is no need to move a large and heavy mirror system (as in the case of a parabolic mirror) but only a number of axes which each only bear the weight of the respective mirrors associated therewith while a large part of the holding structure (frame) is not moved in the course of the day, and in addition there is no need to displace a multiplicity of mirrors in two respective axes, as is the case with a solar tower.

What is claimed is:

1. Apparatus for deflecting received solar energy comprising:
    a target, and
    reflectors for deflecting solar rays on to the target,
    the reflectors each being pivotable about a respective axis for tracking in accordance with the azimuth of the sun in the course of a day, wherein the respective axis is a component part of a common axis arrangement that movably inclines to track in accordance with the midday height of the sun in the course of a year,
    wherein the reflectors include a first reflector for deflection of solar rays through a first plane angle out of a plane of the path of the sun, the first reflector being coupled to a first axis,
    wherein the first axis is constructed and arranged to tilt with respect to an orientation plane of the common axis arrangement through a first axis angle in a first rotational direction,
    wherein the first reflector is constructed and arranged to tilt with respect to the first axis through a first reflector angle in a second rotational direction while the first axis tilts in the first rotational direction, and
    wherein the first rotational direction is oriented opposite to the second rotational direction.

2. Apparatus according to claim 1 further comprising a pivotal drive system for common pivotal movement of a plurality of reflectors about the respective axis.

3. Apparatus according to claim 1 further comprising a pivotal drive device associated with one of either a reflector or an axis for pivoting the reflector or the reflectors associated with the axis.

4. Apparatus according to claim 1 wherein a part of the reflectors is tilted with respect to the respective axis.

5. Apparatus according to claim 1 wherein a part of the reflectors is operatively connected with the respective axis so as to tilt with respect to the respective axis.

6. Apparatus according to claim 5 further comprising a tilt drive system for joint tilting of a plurality of reflectors with respect to their respective axis.

7. Apparatus according to claim 5 further comprising a tilt drive device associated with either of (i) a reflector of the plurality of reflectors or (ii) an axis for tilting either a reflector or a plurality of reflectors associated with the axis.

8. Apparatus according to claim 1 further comprising a drive for pivoting and tilting a plurality of reflectors.

9. Apparatus according to claim 1 wherein the target is coupled to the axis arrangement stationarily relative to the axis arrangement.

10. Apparatus according to claim 1 further comprising a movable interconnection between each of the target and the axis arrangement, constructed and arranged to allow the target to move independently of the axis arrangement.

11. Apparatus according to claim 1 wherein the reflectors include a second reflector for deflection of solar rays through a second plane angle which differs from the first plane angle out of the plane of the path of the sun and is coupled to a second axis, wherein the second axis is constructed and arranged to tilt with respect to the orientation plane of the common axis arrangement through a second axis angle in a third rotational direction, wherein the second reflector is constructed and arranged to tilt with respect to the second axis through a second reflector angle in a fourth rotational direction while the second axis tilts in the third rotational direction, and wherein the third rotational direction is oriented opposite to the fourth rotational direction.

12. Apparatus according to claim 1 wherein the first reflector angle corresponds to the first plane angle and the first axis angle corresponds to an oppositely related half of the first plane angle.

13. A method of deflecting solar energy comprising the steps:

providing an apparatus that includes a solar energy target and solar energy reflectors, and deflecting, with the reflectors, solar rays on to the target, wherein the reflectors are pivoted about a respective axis for tracking in accordance with the azimuth of the sun in the course of a day, wherein the respective axis is a component part of a common axis arrangement which is inclined for tracking in accordance with the midday height of the sun in the course of a year, wherein the step of providing further includes, arranging a first reflector of the reflectors, which is coupled to a first axis, to deflect the solar rays through the first plane angle out of a plane of the path of the sun, the step of arranging including tilting the reflector in a first rotational direction, tilting the first axis with respect to an orientation plane of the axis arrangement through a first axis angle in a second rotational direction while the first axis tilts in the first rotational direction, wherein the first rotational direction is opposite the second rotational direction.

* * * * *